United States Patent
Francisco et al.

(10) Patent No.: US 12,510,048 B2
(45) Date of Patent: Dec. 30, 2025

(54) METHOD FOR DETERMINING THE ARRANGEMENT OF WAVE ENERGY CONVERTERS

(71) Applicant: SEABASED LIMITED, Dublin (IE)

(72) Inventors: Francisco Gemo Albino Francisco, Uppsala (SE); Anders Kronberg, Lysekil (SE)

(73) Assignee: SEABASED LIMITED, Dublin (IE)

( * ) Notice: Subject to any disclaimer, the term of this patent is extended or adjusted under 35 U.S.C. 154(b) by 0 days.

(21) Appl. No.: 18/008,879

(22) PCT Filed: Jun. 7, 2021

(86) PCT No.: PCT/SE2021/050543
§ 371 (c)(1),
(2) Date: Dec. 7, 2022

(87) PCT Pub. No.: WO2021/251880
PCT Pub. Date: Dec. 16, 2021

(65) Prior Publication Data
US 2023/0213015 A1      Jul. 6, 2023

(30) Foreign Application Priority Data
Jun. 8, 2020   (EP) .................................... 20178668

(51) Int. Cl.
*F03B 13/18*   (2006.01)
*H02K 7/18*    (2006.01)
(52) U.S. Cl.
CPC ............... *F03B 13/18* (2013.01); *H02K 7/18* (2013.01)

(58) Field of Classification Search
CPC .......... F03B 13/12; F03B 13/14; F03B 13/18; F03B 13/22
See application file for complete search history.

(56) References Cited

U.S. PATENT DOCUMENTS

| 4,302,161 A | 11/1981 | Berg |
| 7,886,680 B2 | 2/2011 | Draper |

(Continued)

FOREIGN PATENT DOCUMENTS

| AU | 2014 253 747 | 11/2015 |
| CN | 103867379 | 6/2014 |

(Continued)

OTHER PUBLICATIONS

The International Search Report (ISR) with Written Opinion for PCT/SE2021/050543 dated Jul. 16, 2021, pp. 1-12.

(Continued)

*Primary Examiner* — Sean Gugger
(74) *Attorney, Agent, or Firm* — McDonnell Boehnen Hulbert & Berghoff LLP

(57) ABSTRACT

Disclosed herein is a method for determining the arrangement of wave energy converters in a wave power park in a seabed or lake area including the steps of: measuring wavelength and wave direction over a period of time, collecting all values measured for the wavelength and the wave direction in a matrix, statistically determining, from the matrix, a predominant wavelength and a predominant wave direction, and arranging an amount X of wave energy converters at regular intervals over a distance that corresponds to half of the length of the predominant wavelength or a multiple thereof, where the distance is measured in a direction at least more or less parallel to the predominant wave direction.

8 Claims, 3 Drawing Sheets

(56) References Cited

U.S. PATENT DOCUMENTS

| | | | |
|---|---|---|---|
| 2003/0193197 A1 | 10/2003 | Hibbs et al. | |
| 2007/0090652 A1* | 4/2007 | Leijon | F03B 13/189 290/53 |
| 2012/0126667 A1* | 5/2012 | Schapeler | F03B 13/14 310/339 |
| 2013/0313832 A1* | 11/2013 | Peckolt | F03B 13/16 290/54 |
| 2014/0042748 A1 | 2/2014 | Siegel | |
| 2014/0097617 A1* | 4/2014 | Rohrer | F03B 13/182 290/42 |
| 2014/0117671 A1* | 5/2014 | Gregory | F03B 13/20 290/53 |
| 2014/0117673 A1 | 5/2014 | Phillips | |
| 2016/0061180 A1* | 3/2016 | Eavis | F03B 13/182 417/330 |
| 2017/0009732 A1* | 1/2017 | Mundon | H10N 35/101 |
| 2021/0301781 A1* | 9/2021 | Abaitancei | F15B 1/024 |
| 2022/0290647 A1* | 9/2022 | Foster | B63B 21/50 |

FOREIGN PATENT DOCUMENTS

| | | |
|---|---|---|
| EP | 1611348 | 1/2006 |
| GB | 2512627 | 10/2014 |
| GB | 2549283 | 10/2017 |
| WO | 2010085188 | 7/2010 |
| WO | 2013/029012 A1 | 2/2013 |

OTHER PUBLICATIONS

European Search Report for Patent Application No. EP 20178668 dated Oct. 8, 2020, 2 pages.

\* cited by examiner

METHOD FOR DETERMINING THE ARRANGEMENT OF WAVE ENERGY CONVERTERS

CROSS REFERENCE TO RELATED APPLICATIONS

This application is a U.S. national phase of International Application No. PCT/SE2021/050543, filed on Jun. 7, 2021, which claims priority to European Application No. 20178668.8, filed Jun. 8, 2020, both of which are incorporated by reference herein in their entirety.

FIELD OF THE DISCLOSURE

The disclosure relates to a method for determining the optimal arrangement of wave energy converters in wave power parks comprising several wave energy converters.

BACKGROUND

When designing wave power parks many parameters need to be considered and taken into account. The list comprises dominant or primary wave direction, dominant and primary wind direction, dominant or primary wavelength and therewith dominant or primary wave period. Each and every wave climate, in particular in coastal areas, thus about 0 to 10 km from the shore, has a predominant wave condition meaning predominant wave direction where the waves are coming from, predominant wavelength, predominant wave amplitude and predominant wave frequency.

Research has shown that it is important to be aware and know these parameters as good and as exact as possible prior to the actual planning and in particular prior to the installation of the wave power park.

In cases these parameters are not known, not investigated and/or not taken into consideration when planning and building a wave power park, then the resulting problem may require expensive measures, such as installing equipment that tolerates much higher electric power (voltage and current strength) or power fluctuations than what is actually necessary if proper investigation and planning takes place. This leads to increased use of resources and higher cost. In addition, unproper planning can lead to an unstable power supply, which poses problems for the operator, since the grid usually requires a rather stable power input with a comparably high base load.

In the past some sort of energy storage, for example in the form of capacitors or batteries has been proposed to flatten out power fluctuations and avoid equipment damage. Up to this day it has proven to be either technically difficult to use energy storage (batteries) or too expensive (capacitors). It is however conceivable that the option of energy storage to handle power fluctuations on a short term basis, can be used in the future. In particular capacitors could be of interest once economic and reliable solutions are available.

SUMMARY

The inventor of the present disclosure has realized that with proper planning and careful investigation of the predominant wave climate in a coast- or shore region of interest it is possible to substantially optimize the power output, the amount of resources used and also optimize the use of financial resources. The inventor further discovered that two parameters are of particular importance, namely the predominant wave direction of incoming waves and the predominant wavelength of the incoming waves. The inventor finally discovered that each wave energy converter has two energy peaks per wave cycle, which determines the arrangement of the wave energy converters along a primary wave direction at a certain distance from one another for optimal power output and minimized power fluctuation.

Disclosed herein is a method for determining the arrangement of wave energy converters in a wave power park in a sea- or lake area comprising the steps of:
Measuring wavelength and wave direction over a period of time;
Collecting all values measured for the wavelength and the wave direction in a matrix;
Statistically determining, from the matrix, a predominant wavelength and a predominant wave direction;
Arranging an amount X of wave energy converters at a regular intervals over a distance that corresponds to half of the length of the predominant wavelength (PWL) or a multiple thereof, wherein the distance is measured in a direction at least more or less parallel to the predominant wave direction.

Arranging the wave energy converters at a regular interval over a distance that corresponds at least half of the length of the wavelength results in a stable power output, since the power peak of each wave energy converter occurs not at the same time as the adjacent neighbouring wave energy converter. This reduces power peaks and fluctuations and stabilizes the power output of the plurality of wave energy converters.

It is further explained herewith that a multiple means ½, 1, 1½, 2, 2½ or 0.5, 1, 1.5, 2, 2.5 and so on of the predominant wavelength. It is thus in particular also possible to equally distribute the amount of X wave energy converters along an entire length of the predominant wavelength as measured in a direction at least more or less parallel to the predominant wave direction.

In an embodiment of the disclosure X is a whole number, and wherein the interval (IL) between two adjacent wave energy converters is calculated by $$IL = K * \frac{1}{X} * \frac{1}{2} PWL,$$

whereby K is a number from 1 to 10 or higher, such as 1 to 100.

The above provides a basis for calculating the interval between immediately adjacent wave energy converters. The result will be a distance/interval in meters along which the wave energy converters are then spaced.

The method may further comprise the step of arranging the plurality of wave energy converters so that at least adjacent neighbouring wave energy converters are arranged shifted, as seen in a direction along the predominant wave direction.

The above may be understood as to arrange the plurality of wave energy converters on a line that is arranged perpendicular or inclined compared to the predominant wave direction. Even circular, elliptic is possible as long as immediate neighbouring wave energy converters are arranged shifted, as seen in a direction along the predominant wave direction. This means that immediate or adjacent neighbouring wave energy converters are not arranged on a straight line oriented parallel with the predominant wave direction, but instead shifted as seen along a direction that is parallel or corresponds to the predominant wave direction.

This reduces the effect of the wake of floating bodies or buoys arranged upstream the predominant wave direction on floating bodies or buoys arranged downstream the predominant wave direction.

The method may further include the step of arranging the plurality of wave energy converters on a V-shaped line, a U-shaped line, on a horseshoe shaped line, on a semi-elliptic line or a semi-circular line.

The above described line shapes describe lines on which the wave energy converters are arranged as seen from the sky towards the ocean—or lake floor.

The described line shapes improve energy harvesting, maintenance handling and at the same time it takes the optimal interval spacing in view of the predominant wavelength and shifting in view of the predominant wave direction between immediate neighbouring wave energy converters into account.

The wave energy converters may comprise a floating body, a wire, a housing anchored in the sea- or lakebed, said housing comprising a stator and a seesawing translator, whereby the seesawing translator is connected via the wire to the floating body.

The plurality of wave energy converters may be equally distributed in multiple arrays, wherein each array comprises one or more V-shaped line(s), U-shaped line(s), horseshoe-shaped line(s), on semi-elliptic line(s) or semi-circular line (s), as seen towards the lake- or ocean floor and wherein the wave energy converters are arranged, at least more or less regularly spaced on the V-shaped lines, U-shaped lines, horseshoe shaped lines, semi-elliptic lines or semi-circular lines. The described lines above may be summarized with the term symmetric, open concave Line or Geometry. Each array may comprise two symmetric, open concave lines or geometries arranged parallel with another and with a symmetry axis oriented parallel to the predominant wave direction.

The method may further comprise the step of connecting the amount of X wave energy converters to an inverter wherein X is a number chosen from the range of 4 to 8 wave energy converters, and wherein the distance between two adjacent wave energy converters connected to the inverter is calculated according to the above formula.

X may be any amount chosen from 5 to 7 wave energy converters, such as for example 5 wave energy converters.

This leads to a stable power output and therewith to a stable load/strain and exposure of the corresponding converters or inverter systems. There may be a plurality of converter system or inverter system integrated in a marine substation, each converter/inverter—system handling about 4 to 8 wave energy converters, preferably 5 to 7 wave energy converters and more preferably 5 wave energy converters.

In addition to the above, herein the following definitions are used to explain and describe the disclosure.

Definitions

Predominant Wave Direction of Incoming Waves

Every coastal area has one primary or predominant wave direction. In some cases there may be two main wave directions, one about 180 degrees turned to the other. In particular in shore areas the primary wave direction is however rather stable and varies only with a few degrees. This can be used when wave power parks are planned and installed, since they are typically installed in coastal areas close to the shore, for example within 0-10 km from the shore. Determining the primary or predominant wave direction is important for the planning and the operation of the wave power park. Herein the predominant wave direction is relating to the direction along which the waves travel, thus along which the wave peaks and wave troughs move. The predominant wave direction can of course vary from area to area depending on winds, currents, sea-shore structure and sea-base structure.

Predominant Wavelength of Incoming Waves

Similar to the above described predominant wave direction it is possible to determine the predominant wavelength of the incoming waves. This can be measured with buoys and sensors for instance. The predominant wavelength can be determined by measuring the wave period thus how long it takes from peak to peak or trough to trough and then by determining the speed of the incoming waves.

Neighboring Wave Energy Converters

Herein the term neighboring energy converters or immediate neighboring wave energy converters describes two energy converters that are immediately adjacent one another without any other wave energy converter arranged in between. If a group of wave energy converters is connected to an inverter, then the wave energy converters of this group are spaced a quarter of the predominant wavelength to the next one and so one in order to reduce power fluctuations and stabilize electric energy output from the that converter.

Wave Front

The wave front is a direction along which the wave troughs and wave peaks extend. The wave front is typically oriented perpendicular to the (primary) wave direction. As the primary wave direction so can the wave front vary its direction depending on winds, sea-shore structure and so on.

Wavelength

The term wavelength used herein describes the length of an incoming ocean wave from peak to peak or trough to trough thus a length as measured in centimeters or meters (or any other length dimension for that matter) of an entire cycle of the ocean wave.

Wave Energy Converter

The arrays and arrangements described herein mainly refer to wave energy converters of the type as described in EP2318697 B1. Such a wave energy converter typically comprises a floating body, a wire and a housing anchored in the sea- or lakebed. The housing comprising a linear stator and a seesawing translator, whereby the seesawing translator is connected via the wire to the floating body. When waves move the floating body up and down the wire pulls the translator up and down in a seesawing movement. This produces energy since the translator moves along the stator, which creates inductive energy. This is on type of wave energy converter for which the described array is suitable, there may however be other types of wave energy converters that can be arranged in an array as described.

A Cluster or Array of Wave Energy Converters

The term cluster or array of wave energy converters used herein describes an arrangement of somewhere in between 10 to 30 wave energy converters arranged in an array and connected to a marine substation. A wave power park may consist of several such arrays. When the geometric arrangement of an array is described herein it is always described as seen in the bird (or drone) view thus from the top down; from the sky towards the ocean surface and seabed, respectively.

Symmetric, Open Concave Line or Geometry (as Seen from Above)

Herein a symmetric, open, concave line or geometry describes a line that is either V-shaped, U-shaped, at least more or less half elliptic, Y-shaped, at least more or less half circled, concave or any combination thereof. When the geometry of the symmetric, open concave line is described herein, it is always described as seen in the bird (or drone) view thus from the top down; from the sky towards the ocean surface and seabed, respectively.

BRIEF DESCRIPTION OF THE FIGURES

The present disclosure will now be described, for exemplary purposes, in more detail by way of an embodiment(s) and with reference to the enclosed drawings, in which:

FIG. 1 illustrates a wave energy converter 1 of the type described and used in the method disclosed herein. The wave energy converter 1 comprises a buoy 2 (floating body), a wire 4, a housing 6, which housing 6 is shown in a cross-sectional view for illustrative purposes, a stator 10 and a translator 8. The housing 6 is anchored on the seabed 16. The buoy 2 is configured to ride or float on the waves 14 that pass the wave energy converter 1 along a primary wave direction 12. When the waves 14 pass, the buoy 2 is moved up and down thereby moving the translator 8 in a seesawing motion, which generates electric energy when the translator 8 moves along the stator 10 due to an electro inductive process. The size of the buoy 2 can be adapted according to the needs to generate a distinct seesawing motion of the translator 8, for instance if the wave energy converter 1 is placed further downstream, as seen a long the wave direction 12 as another wave energy converter (not shown) arranged upstream the one illustrated in FIG. 1.

FIG. 2 illustrates the Power output in kilowatt over time, shown in the upper part of FIG. 2, and the corresponding wave shape of the ocean wave in wave height and time, shown in the lower part of FIG. 2. As can be seen from FIG. 2, the ocean wave period is approximately five (5) seconds. When comparing these five seconds with the upper part of FIG. 2 it can be seen that each wave energy converter 1 (WEC) has two power output peaks per wave period and therewith per entire wave cycle, which translates to the wavelength or predominant wavelength (PWL). This can be used for the planning of wave energy parks, when determining the optimal arrangement of wave energy converters 1 in such a park, as explained in connection with FIG. 3. The two peaks in the power output determine the shortest length along which a plurality of wave energy converters 1 can be positioned at regular intervals and this length is ½ of the predominant wavelength. Any multiple of this ½ of the predominant wavelength works of course as well. Distributing the plurality of the wave energy converters 1 at regular intervals over such a distance will result in an even and balanced power output as FIG. 3 and in particular FIG. 4 will show.

FIG. 3 schematically illustrates the principle of the present disclosure, illustrating the five wave energy converters 1a, 1b, 1c, 1d, 1e arranged on an ocean floor and spaced apart depending and according to the incoming predominant waved direction 12. For illustrative purposes the wave energy converters 1a, 1b, 1c, 1d, 1e are shown to be regularly spaced apart over an entire wavelength by ⅕ of a wave length as shown and as measured along a direction parallel to the predominant wave direction 12. As seen in FIG. 3, it is possible to arrange the wave energy converters 1a, 1b, 1c, 1d, 1e on an inclined line versus the predominant wave direction as long as the distance as measured parallel to the predominant wave direction is corresponding to ⅕ of the wavelength. An alternative shape to the inclined line may be a circular line, an elliptic line or a U-shaped line, a V-shaped line or any combination thereof. If, for instance a V-shaped line is used, then one leg of the V-shaped line may comprise five wave energy converters 1a, 1b, 1c, 1d, 1e and the other leg as well five wave energy converters (not shown), whereby the wave energy converters 1a, 1b, 1c, 1d, 1e of one leg are connected to an inverter system and the wave energy converters of the other leg to another inverter in order to balance the power output. So the five wave energy converters 1a, 1b, 1c, 1d, 1e as shown in FIG. 2 are connected to one inverter in order to avoid power peaks on a single inverter system. The inverter system may comprise a rectifier, a DC/DC converter, an inverter and a transformer. Optionally the inverter system may comprise an active rectifier, an inverter and a transformer.

Figure 1:
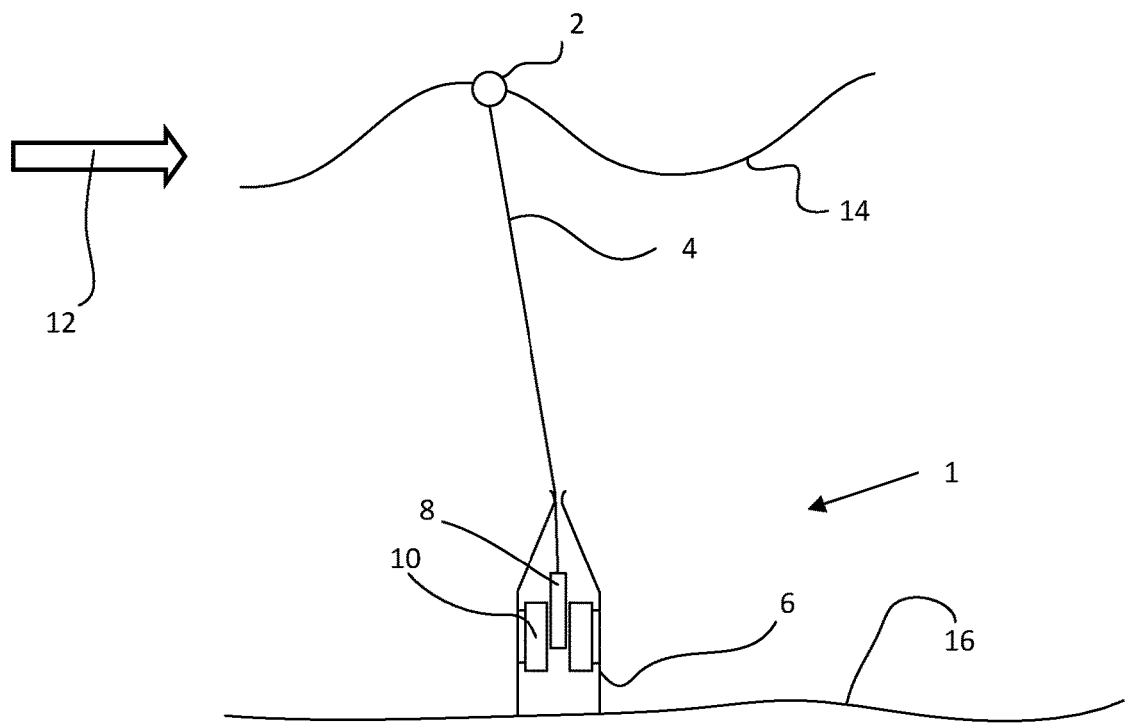
FIG. 1 schematically illustrates a wave energy converter for which type the disclosure described herein can be applied.
Figure 2:
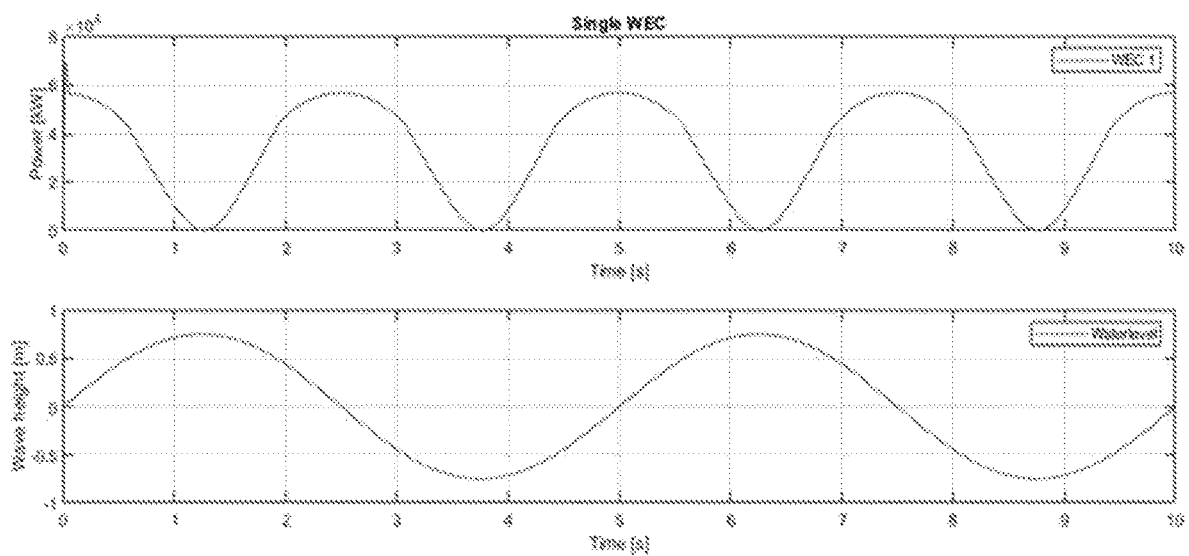
FIG. 2 schematically illustrates a theoretic arrangement of wave energy converters on the seafloor.
Figure 3:
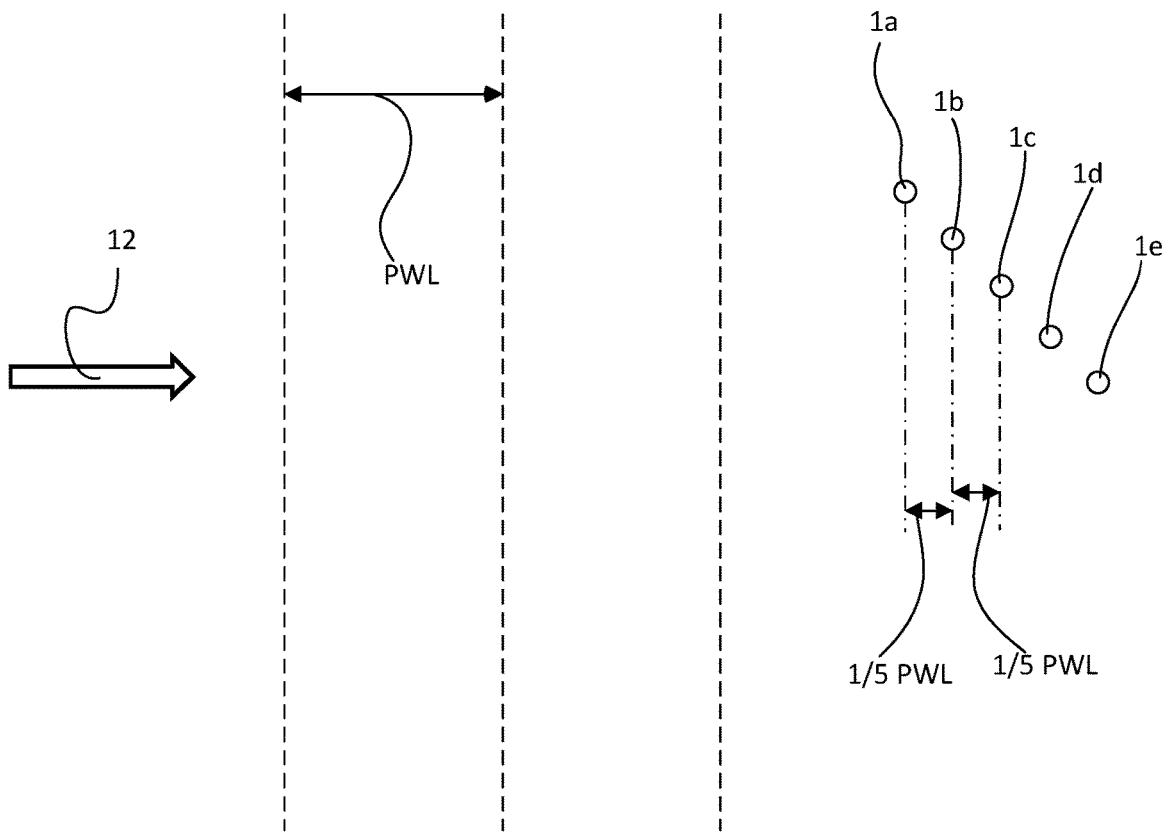
FIG. 3 schematically illustrates a shape of an ocean wave versus the corresponding power output of a wave energy converter as illustrated and described in FIG. 1.

The three dashed lines in FIG. 3 illustrate the direction of extension of the wave peaks (or troughs) of incoming waves. These wave peaks travel along the predominant wave direction 12 and determine the predominant wave length (PWL), as illustrated.

Figure 4:
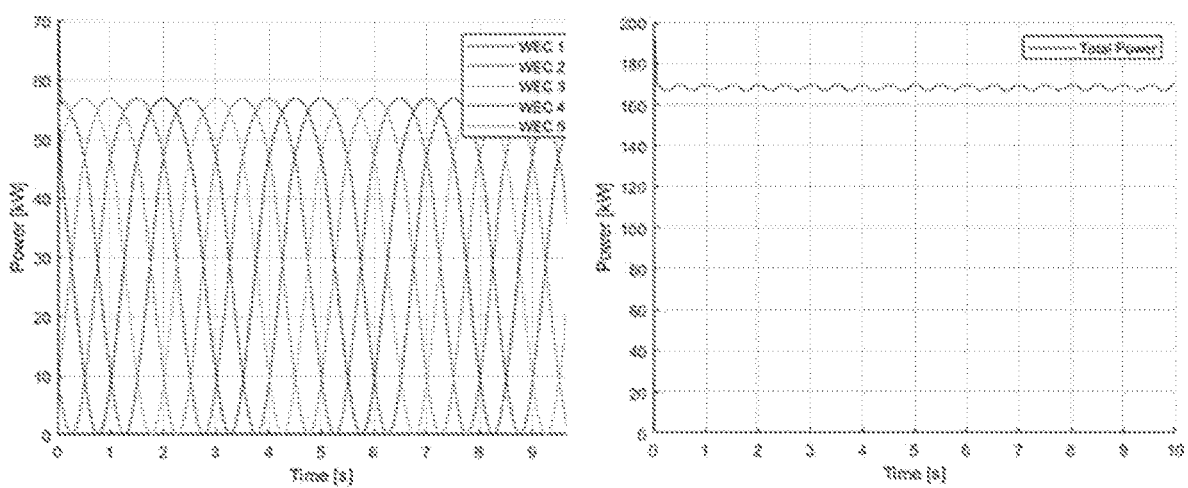
FIG. 4 schematically illustrates on a left side the power out of 5 wave energy converters alone and on the right side the summarized curve when all curves on the left side are combined.

FIG. 4 illustrates a graph of the power output of five wave energy converters 1a, 1b, 1 c, 1d, 1e positioned along ⅕ of the predominant wavelength PWL at regular intervals, on the left side of FIG. 4. The right side of FIG. 4 illustrates the overlay/superposition of the power output graphs of the right side of FIG. 4 and it can be well seen how the power output is balanced and stable. If the spacing is not done over a multiple of ½ of the predominant wavelength or if the intervals are not regular, then the power output of the superposition will have peaks, which poses a risk, in particular for the inverter system, which is typically integrated in a marine substation.

Figure 5:
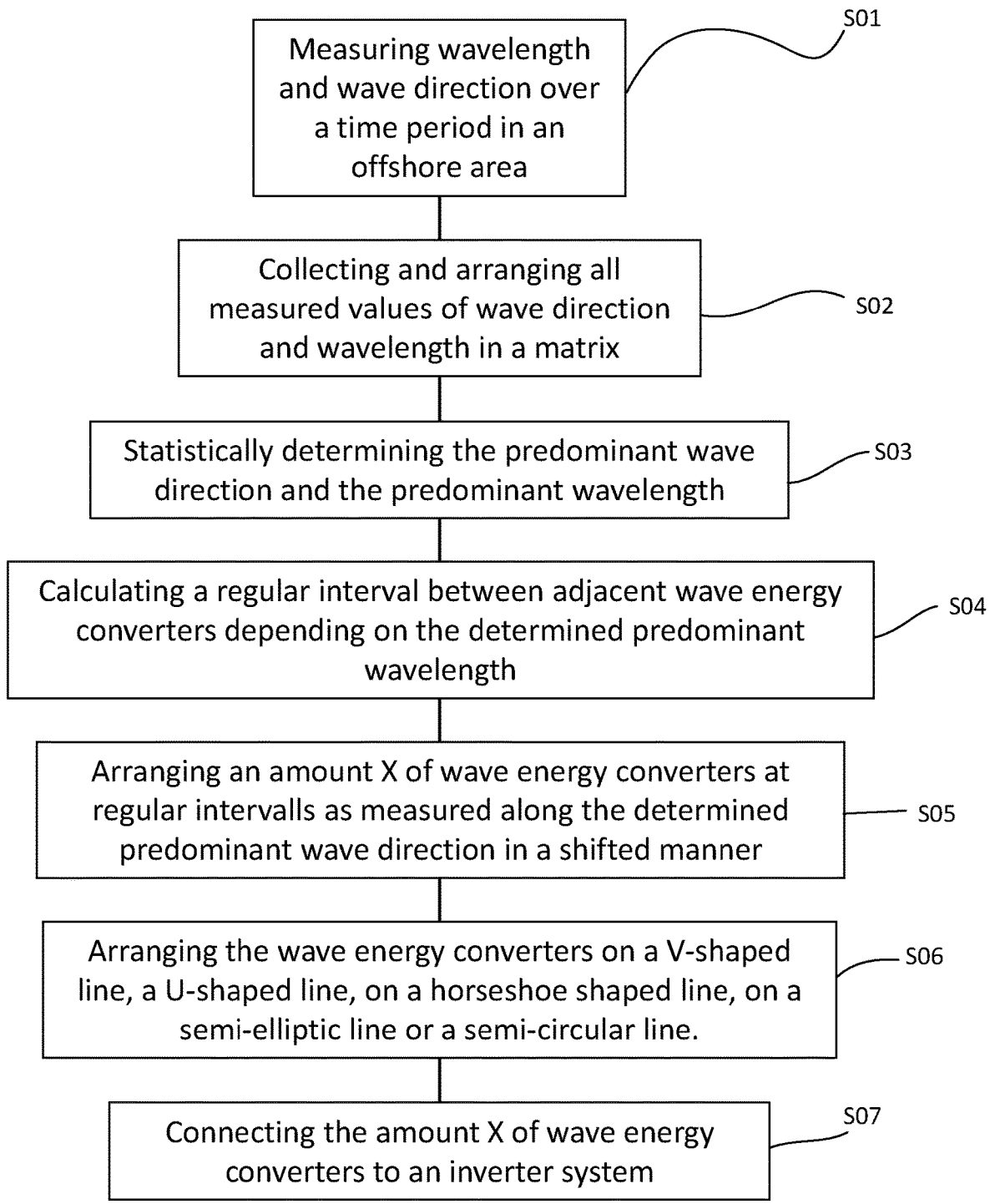
FIG. 5 schematically illustrates a method according to the disclosure.

Turning now to FIG. 5, which schematically illustrates a method according to the present disclosure. The method comprises various steps for determining the optimal arrangement of wave energy converters 1, 1a, 1b, 1c, 1d, 1e in an offshore area. The steps may comprise the following:

Measuring S01 wavelength and wave direction over a period of time;

Collecting S02 all values measured for the wavelength and the wave direction in a matrix;

Statistically determining S03, from the matrix, a predominant wavelength (PWL) and a predominant wave direction;

Arranging S05 an amount X of wave energy converters at regular intervals over a distance that corresponds to half of the length of the predominant wavelength (PWL) or a multiple thereof, wherein the distance is measured in a direction at least more or less parallel to the predominant wave direction.

The period of time may be several months or a few years, it should at least include data of all seasons, thus summer, autumn, winter and spring. In addition, at least two to four measurements should be performed every day, such as morning, evening and night.

The statistical determination of the predominant wave direction and the predominant wavelength is determined by a frequency of occurrence and/or a probability density function of characteristic values and may be done using available tools such as for example Microsoft excel or specialized programs, such as high-level programming languages.

The method may further comprise the step of calculating S04 the regular interval between two adjacent wave energy converters using the following formula:

$$IL = K * \frac{1}{X} * \frac{1}{2} PWL,$$

wherein K is a whole number chosen from 1 to 10.

Spacing the wave energy converters according to the value of the interval IL evens out the fluctuations in the power output of the amount X of the wave energy converters.

The wave energy converters 1, 1a, 1b, 1c, 1d, 1e may also be spaced according to another calculation, the requirement being that the interval between two immediately adjacent wave energy converters is regular as measured in a direction along the predominant wave direction PWL.

In an embodiment the amount X of wave energy converters 1, 1a, 1b, 1c, 1d, 1e may further be arranged S06 on a V-shaped line, a U-shaped line, on a horseshoe shaped line, on a semi-elliptic line or a semi-circular line.

A further step may comprise the connection S07 of the amount X of wave energy converters 1, 1a, 1b, 1c, 1d, 1e to one single inverter system. This leads to a stable power load on the inverter system.

The inverter system is typically embedded in a marine substation. The marine substation may comprise more than one inverter system. The components of the various inverter systems can also be shared within the marine substation. In an example the marine substation may comprise four inverter system, each inverter system being connected to five wave energy converters 1, 1a, 1b, 1c, 1d, 1e, which five wave energy converters 1, 1a, 1b, 1c, 1d, 1e are regularly spaced over ½ of the predominant wave length and the interval IL between two adjacent wave energy converters is thus ¹/₁₀ of the predominant wavelength (PWL).

A wave power park typically comprises several arrays of wave energy converters (not shown) and these arrays are oriented so that they take the predominant wave direction and the predominant wavelength into account. The method described herein allows to arrange and position the wave energy converters in an optimal manner to achieve a stable power output, increase efficiency, and increase applicability of the entire system.

The invention claimed is:

1. A method for determining an arrangement of wave energy converters in a wave power park in a sea or lake area comprising the steps of:
    measuring or estimating wavelength and wave direction over a period of time;
    collecting all values measured for the wavelength and the wave direction in a matrix;
    statistically determining, from the matrix, a predominant wavelength (PWL) and a predominant wave direction;
    arranging a number (X) of wave energy converters at regular intervals over a distance that corresponds to half of a length of the predominant wavelength (PWL) or a multiple thereof, wherein the distance is measured in a direction at least more or less parallel to the predominant wave direction; and
    placing the number (X) of wave energy converters on a V-shaped line, a U-shaped line, a horseshoe shaped line, a semi-elliptic line, or a semi-circular line,
    wherein each of the wave energy converters comprises a floating body, a wire, a housing anchored in the seabed or lakebed, the housing comprising a stator and a seesawing translator, wherein the seesawing translator is connected via the wire to the floating body.

2. The method according to claim 1, wherein (X) is a whole number, and wherein the interval (IL) between two adjacent wave energy converters is calculated by $$IL = K * \frac{1}{X} * \frac{1}{2} PWL,$$

wherein K is a whole number chosen from 1 to 10.

3. The method according to claim 1, further comprising the step of arranging the wave energy converters so that at least two adjacent neighbouring wave energy converters are arranged shifted, when observed along a direction parallel to the predominant wave direction.

4. The method according to claim 1, wherein the wave energy converters are equally distributed in multiple arrays, wherein each array comprises one or more V-shaped line(s), U-shaped line(s), horseshoe-shaped line(s), semi-elliptic line(s), or semi-circular line(s), as seen towards a lake floor or an ocean floor and wherein the wave energy converters are arranged, at least more or less regularly spaced on the V-shaped lines, U-shaped lines, horseshoe shaped lines, semi-elliptic lines or semi-circular lines, as measured along the predominant wave direction.

5. The method according to claim 2, further comprising the step of connecting the number of X wave energy converters to an inverter system wherein X is a number chosen from a range of 4 to 8 wave energy converters, and wherein the distance between two adjacent wave energy converters connected to the inverter system is calculated according to claim 2.

6. The method according to claim 1, the method comprising measuring the wavelength and the wave direction over the period of time.

7. The method according to claim 1, the method comprising estimating the wavelength and the wave direction over the period of time.

8. The method according to claim 1, wherein the housings of the wave energy converters are placed on the V-shaped line, the U-shaped line, the horseshoe shaped line, the semi-elliptic line, or the semi-circular line.

* * * * *